United States Patent
MacDonald

(10) Patent No.: US 9,386,023 B2
(45) Date of Patent: Jul. 5, 2016

(54) METHOD, APPARATUS AND SYSTEM FOR MANAGING PACKET DELIVERY

(75) Inventor: Christopher Donald MacDonald, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 1257 days.

(21) Appl. No.: 12/576,616

(22) Filed: Oct. 9, 2009

(65) Prior Publication Data

US 2011/0088089 A1 Apr. 14, 2011

(51) Int. Cl.
| | |
|---|---|
| G06F 17/00 | (2006.01) |
| H04L 29/06 | (2006.01) |
| H04L 9/32 | (2006.01) |
| G06F 15/173 | (2006.01) |
| H04L 12/26 | (2006.01) |

(52) U.S. Cl.
CPC ............ *H04L 63/102* (2013.01); *H04L 43/00* (2013.01); *H04L 63/0281* (2013.01); *H04L 63/04* (2013.01); *H04L 63/0428* (2013.01); *H04L 63/08* (2013.01); *H04L 63/12* (2013.01)

(58) Field of Classification Search
CPC . H04L 63/0281; H04L 63/04; H04L 63/0428; H04L 63/08; H04L 63/12; H04L 43/00
USPC ........ 726/13, 12; 713/153, 160, 168; 709/224
See application file for complete search history.

(56) References Cited

U.S. PATENT DOCUMENTS

| | | | |
|---|---|---|---|
| 5,898,784 A | 4/1999 | Kirby et al. | |
| 2001/0012296 A1* | 8/2001 | Burgess et al. | 370/392 |
| 2003/0212901 A1 | 11/2003 | Mishra et al. | |
| 2004/0143755 A1* | 7/2004 | Whitaker et al. | 713/200 |
| 2007/0147378 A1* | 6/2007 | Elgebaly et al. | 370/392 |
| 2008/0104186 A1* | 5/2008 | Wieneke et al. | 709/206 |
| 2010/0064133 A1* | 3/2010 | Martin et al. | 713/154 |

FOREIGN PATENT DOCUMENTS

WO    2004/008701 A1    1/2004

OTHER PUBLICATIONS (No stated author); DD-WRT, Supported Devices; Jun. 2008; Retrieved from the Internet <URL: web.archive.org/web/20080614043723/http://www.dd-wrt.com/wiki/index.php/Supported_Devices>; pp. 1-17 as printed.*

(No stated author); DD-WRT, Web Interface; Feb. 2008; Retrieved from the Internet <URL: web.archive.org/web/20080202224937/http://www.dd-wrt.com/wiki/index.php/Web_Interface>; pp. 1-3 as printed.*

(No stated author); DD-WRT, Access Restrictions; Jul. 2008; Retrieved from the Internet <URL: web.archive.org/... 0080701122622/http://www.dd-wrt.com/wiki/index.php/Access_Restrictions#Filtering_Inbound_Traffic>; pp. 1-3 as printed.*

(Continued)

*Primary Examiner* — Aravind Moorthy
(74) *Attorney, Agent, or Firm* — Perry + Currier Inc.

(57) ABSTRACT

Portable electronic devices typically have reduced computing resources, including reduced available bandwidth to receive communications. A method, apparatus and system is provided to manage packet delivery to electronic devices to mitigate some of these problems.

22 Claims, 11 Drawing Sheets

(56) References Cited

OTHER PUBLICATIONS (No stated author); DD-WRT, Iptables; Jul. 2008; Retrieved from the Internet <URL: web.archive.org/web/20080701023832/http://www.dd-wrt.com/wiki/index.php/Iptables>; pp. 1-6 as printed.*

BrainSlayer; ipt_mac with destination support; 2007; Retrieved from the Internet <URL: http://svn.dd-wrt.com/changeset/8215>; pp. 1-2 as printed.*

Myers et al.; RFC 2797, Certificate Management Messages over CMS; 2000; Retrieved from the Internet <URL: ietf.org/rfc/rfc2797.txt.pdf>; pp. 1-47 as printed.*

(No stated author); BlackBerry Wireless Enterprise Activation; 2004; Retrieved from the Internet <URL: docs.blackberry.com/nl-nl/admin/deliverables/3643/BlackBerry_Wireless_Enterprise_Activation_Technical_White_Paper.pdf>; pp. 1-17. as printed.*

(No stated author); SSL Handshake Steps in Detail; 2014; Retrieved from the Internet <URL: .pierobon.org/ssl/ch2/detail.htm>; pp. 1-2 as printed.*

No stated author; 6.3 What Does a Packet Look Like?; Mar. 2015; Retrieved from the Internet <URL: docstore.mik.ua/orelly/networking/firewall/ch06_03.htm>; pp. 1-17 as printed.*

Iolsmit et al.; How to block https (form one IP) to one URL only; 2008; Retrieved from the Internet <URL: dd-wrt.com/phpBB2/viewtopic.php?p=642125>; pp. 1-3 as printed.*

No stated author; Minimum system requirements for BlackBerry Enterprise Server version 2.0 for Lotus Domino with Service Pack 2; Oct. 2001; <URL: blackberry.net/support/pdfs/TAE-00008-001-Minimum_system_req_BES_Domino_SP2.pdf>; pp. 1-2 as printed.*

Freed et al.; Multipurpose Internet Mail Extensions (MIME) Part One: Format of Internet Message Bodies; 1996; Retrieved from the Internet <URL: rfc-editor.org/rfc/pdfrfc/rfc2045.txt.pdf>; pp. 1-31 as printed.*

No stated author; Cisco—Cisco Virtual Firewall Configuration Guide; 2007; Retrieved from the Internet <URL: cisco.com/c/en/us/td/docs/ios_xr_sw/iosxr_r3-5/vfw/configuration/guide/vfw.pdf>; pp. 1-402 as printed.*

No stated author; Cisco2—Configuring Network Security with ACLs; 2005; Retrieved from the Internet <URL: cisco.com/c/en/us/td/docs/switches/lan/catalyst4500/12-2/25sg/configuration/guide/conf.pdf; pp. 1-28 as printed.*

No stated author; Tech Info—IP Message Formats; 2015; Retrieved from the Internet <URL: zytrax.com/tech/protocols/tcp.html>; pp. 1-7 as printed.*

Klensin; RFC 2821—Simple Mail Transfer Protocol; 2001; Retrieved from the Internet <URL: tools.ietf.org/html/rfc2821>; pp. 1-79 as printed.*

No stated author; RIM proprietary protocols; 2015; Retrieved from the Internet <URL: docs.blackberry.com/en/admin/deliverables/16558/RIM_propietary_protocols_1107871_11.jsp>; pp. 1-2 as printed.*

European Patent Application No. 09172671 Search Report dated Dec. 16, 2009.

BlackBerry Forums, downloaded from http://www.blackberryforums.com.au/forums/general-bes-discussion/1135-what-enterprise-activation-process.html.

* cited by examiner

METHOD, APPARATUS AND SYSTEM FOR MANAGING PACKET DELIVERY

FIELD

The present specification relates generally to telecommunications and more specifically relates to a method, apparatus and system for managing packet delivery.

BACKGROUND

Even as wired and wireless access technologies continue to increase their bandwidth, and correspondingly increase their capacity to carry traffic, the access technologies nonetheless represent a limited resource.

DESCRIPTION

Figure 1:
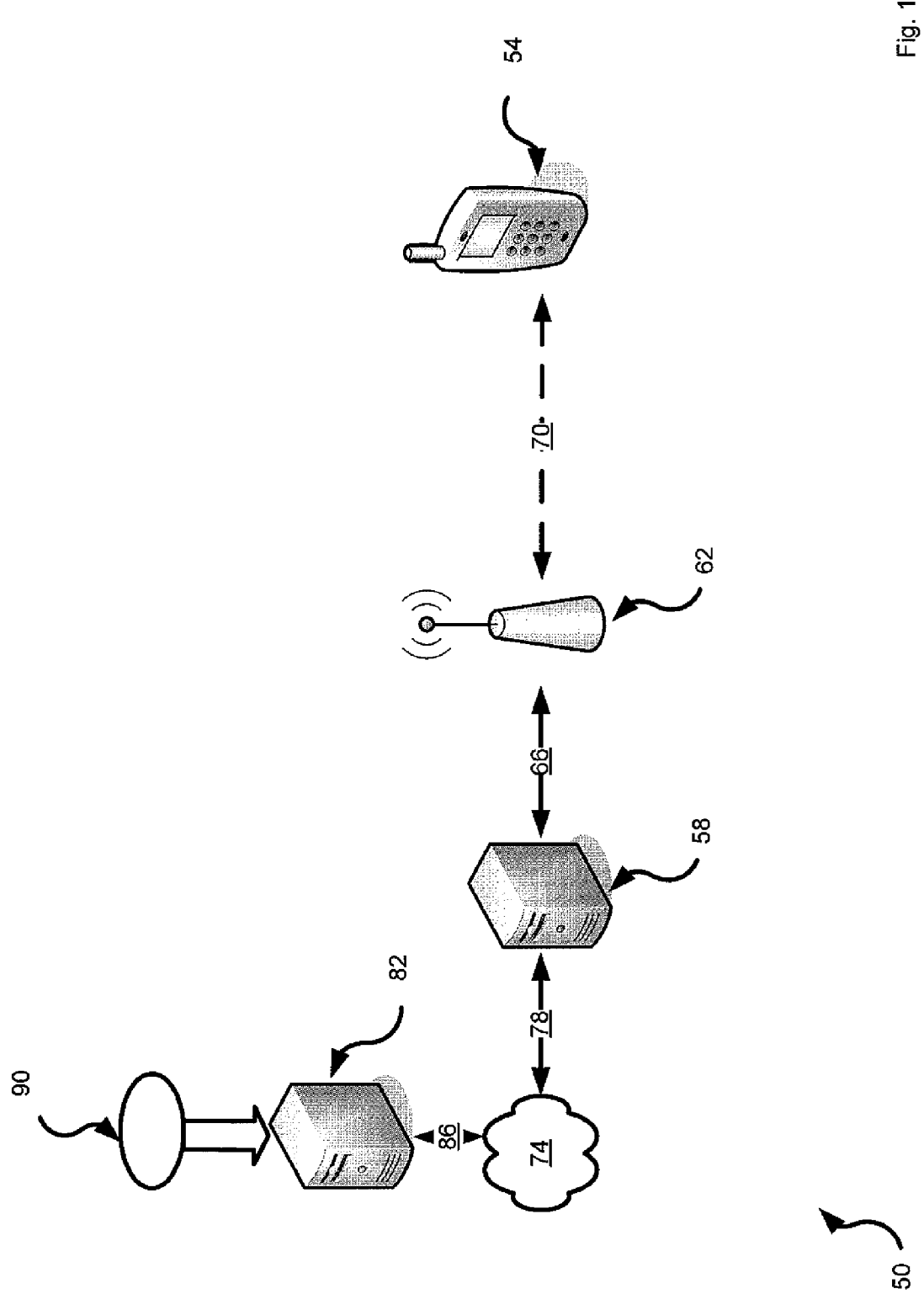
FIG. 1 shows a schematic representation of a system for managing packet delivery.

An aspect of this specification provides a method of managing packet delivery comprising: receiving a message at a transport intermediation server from an origination content computer; said message including an origination identifier associated with said origination content computer; said message including an absolute destination identifier uniquely associated with an electronic device to which said message is addressed; said message including a payload encrypted by said content computer using an encryption mechanism that is unique to said electronic device and said content computer such that said intermediation server cannot decrypt said payload; extracting, at said transport intermediation server, said origination identifier associated with origination content computer; extracting, at said transport intermediation server, said unique absolute destination identifier; receiving, at said transport intermediation server, a delivery policy associated with said unique absolute destination identifier; and, forwarding, at said transport intermediation server, said message to said electronic device if said origination identifier is a permitted sender according to said delivery policy and otherwise, dropping said message.

The unique absolute destination identifier can comprise one of an International Mobile Equipment Identity (IMEI) identifier, or a BlackBerry™ PIN.

The origination content computer can be a content server.

The delivery policy can comprise a white list expressly authorizing deliveries from said origination identifier. The message further can further comprise an indication if said payload comprises activation information for establishing a unique association between a server at said origination identifier and said electronic device; and wherein said delivery policy deems said origination identifier to be a permitted sender if said payload comprises activation information.

The method according can further comprise: prior to receiving said message, receiving an association request from said electronic device at said intermediation server to associate said electronic device with a server associated with said origination identifier; recording said association request; and, wherein said delivery policy deems said origination identifier to be a permitted sender based on said recorded association request.

The message can have a format according to one of the following: a Multipurpose Internet Mail Extension (MIME) format email, an instant message (IM), a vCal calendar appointment, an iCal calendar appointment, a vCard, a video file, or an audio file.

The delivery policy can be unique to said format.

A separate delivery policy can be maintained according to each said format, and each said message can further comprise a message format indication; and said method further comprises; extracting said method format indication; selecting an appropriate said delivery policy based on said method format indication.

Another aspect of the specification provides a computer-readable medium containing programming instructions that are executable on a server in order to configure the server to operate according to any of the foregoing.

Another aspect of the specification provides a transport intermediation server comprising: an interface configured to receive a message from an origination content computer via a network; said message including an origination identifier associated with said origination content computer; said message including an absolute destination identifier uniquely associated with an electronic device to which said message is addressed; said message including a payload encrypted by said content computer using an encryption mechanism that is unique to said electronic device and said content computer such that said intermediation server cannot decrypt said payload; a processor configured to extract said origination identifier associated with origination content computer; said processor further configured to extract said unique absolute destination identifier; said processor further configured to receive a delivery policy associated with said unique absolute destination identifier; and, said processor further configured to forward, via said network interface, said message to said electronic device if said origination identifier is a permitted sender according to said delivery policy and otherwise configured to drop said message.

Referring now to FIG. 1, a system for managing packet delivery is indicated generally at 50. In a present embodiment system 50 comprises a portable electronic device 54 and at least one intermediation server 58. A wireless base station 62 interconnects electronic device 54 and intermediation server 58. A backhaul link 66 interconnects base station 62 with server 58. At least one bearer path 70, typically wireless, can be used to interconnect base station 62 with electronic device 54. In a present exemplary embodiment, bearer path 70 can be based on one or more of Global System for Mobile communications (GSM), General Packet Radio Service (GPRS), Enhanced Data Rates for GSM Evolution (EDGE), the Third-generation mobile communication system (3G), Evolution- Data Optimized (EVDO), Institute of Electrical and Electronic Engineers (IEEE) 802.11 (WiFi) or other wireless protocols. In variations, path 70 can be wired.

Intermediation server 58 is also connected to a network 74 via another backhaul link 78. Network 74 can be any type of network that can deliver content to device 54. In a present embodiment, network 74 is the Internet and connects to a sending server 82 which connects to network 74 by another backhaul link 86.

Figure 2:
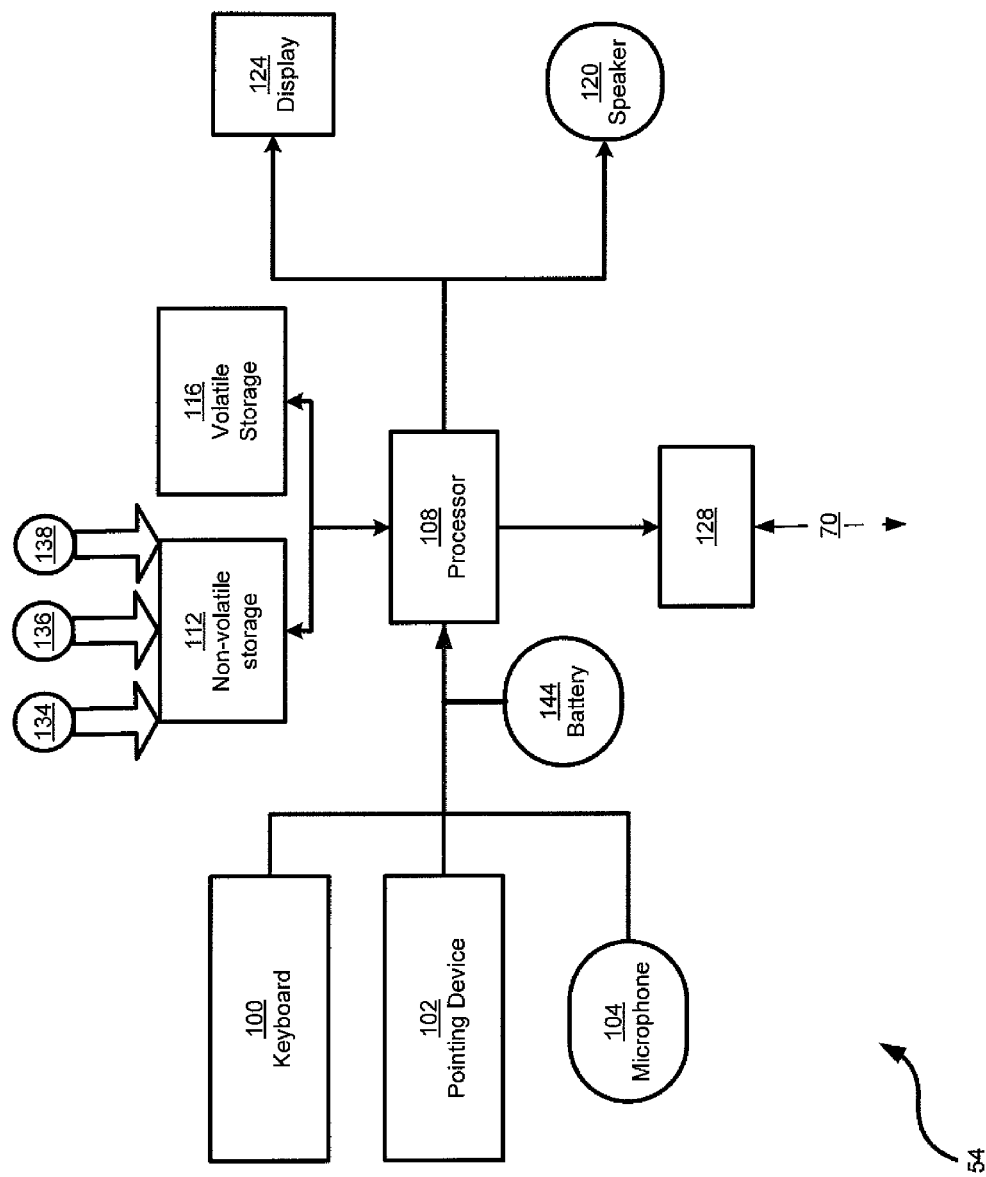
FIG. 2 shows a schematic representation of the electronic device shown in the system of FIG. 1.

Referring now to FIG. 2, electronic device 54 can be any type of computing device that can be used in a self-contained manner and to interact with content available over network 74. Interaction includes displaying of information on electronic device 54 as well as to receive input at electronic device 54 that can in turn be sent back over network 74. It should be emphasized that the structure in FIG. 2 is purely exemplary, and contemplates a device that be used for both wireless voice (e.g. telephony) and wireless data (e.g. email, web browsing, text) communications. In a present embodiment, electronic device 54 is a portable electronic device with the combined functionality of a personal digital assistant, a cell phone, and an email paging device. (Although variants on device 54 can include a palm top computer or laptop computer with a reduced screen such as an ASUS EEE from ASUSTek Computer Inc. of Taiwan). Many known cellular telephone models, or variants thereof, are suitable for the present embodiment.

Device 54 thus includes a plurality of input devices which in a present embodiment includes a keyboard 100, a pointing device 102, and a microphone 104. Pointing device 102 can be implemented as a track wheel, trackball or the like. Other input devices, such as a touch screen are also contemplated. Input from keyboard 100, pointing device 102 and microphone 104 is received at a processor 108. Processor 108 is configured to communicate with a non-volatile storage unit 112 (e.g. Erasable Electronic Programmable Read Only Memory ("EEPROM"), Flash Memory) and a volatile storage unit 116 (e.g. random access memory ("RAM")). Programming instructions that implement the functional teachings of device 54 as described herein are typically maintained, persistently, in non-volatile storage unit 112 and used by processor 108 which makes appropriate utilization of volatile storage 116 during the execution of such programming instructions.

Processor 108 in turn is also configured to control a speaker 120 and a display 124. Processor 108 also contains at least one network interface 128, which are implemented in a present embodiment as radios configured to communicate over bearer path 70. In general, it will be understood that interface(s) 128 is (are) configured to correspond with the network architecture that defines a particular bearer path 70. It should be understood that in general a wide variety of configurations for device 54 are contemplated.

In a present embodiment, device 54 is also configured to maintain a unique device identifier 134, a message application 136, and a configuration file 138 maintained within non-volatile storage 112.

Device identifier 134 represents a unique absolute identifier of device 54. Exemplary device identifiers can include, but are not limited to, an International Mobile Equipment Identity (IMEI) identifier, or a BlackBerry™ PIN as commonly employed in BlackBerry™ devices from Research In Motion Inc., Waterloo, Ontario Canada. Other exemplary device identifiers will now occur to those skilled in the art. It is thus presently preferred that identifier 134 is absolute, non-changeable and non-transferrable, being specifically assigned to the hardware of device 54.

Processor 108 is also configured to execute message application 136, which is able to receive messages at device 54 which are addressed to unique device identifier 134. Device identifier message application 136 is also configured to send messages to other devices (not shown), using any suitable destination address identifier, including but not limited to a unique device identifier for the destination. For sent messages, unique device identifier 134 can be used to identify the sender of such messages, although this is not required.

While the use of unique device identifiers is specific to the receipt of messages via message application 136, the type of messages that can be sent and received via device identifier message application 136 is not specific, and can include emails (e.g. Multipurpose Internet Mail Extensions (MIME)), instant messages (IM), calendar appointments (e.g. vCal, iCal), contact information (e.g. vCard), video files, or audio files or other types of messages as well. In general the type of messages sent and received by message application 136 is not particularly limited. It will be understood that other applications can also be provided in non-volatile storage 112 that interact with messages that are also handled by device identifier message application 136.

Processor 108 is configured to access configuration file 136 in order to establish initial settings for one or more applications, including message application 136, as well as to define any relevant communication gateways on network 74 that correspond to each of those applications. As will be discussed further below, configuration file 138 is configured in a present embodiment to maintain a whitelist of sending addresses that are permitted to send messages to device 54 using message application 136. While a BlackBerry™ computing environment is not required to implement the present teachings, where a BlackBerry™ computing environment is used to implement device 54, then configuration file 138 can be implemented as a BlackBerry™ Service Book or as one or more specific entries within a BlackBerry™ Service Book.

Processor 108 is also configured to receive input from keyboard 100 relative to message application 136 and to generate graphical interfaces on display 124. Processor 108 is further configured to send and receive messages associated with message application 136, via network 74 and bearer path 70, utilizing configuration file 136, as will be discussed further below.

Device 54 also includes a battery 144 or other power supply. Battery 144 provides power to components within device 54.

Server 58 can be based on any well-known server environment including a module that houses one or more central processing units, volatile memory (e.g. random access memory), persistent memory (e.g. hard disk devices) and network interfaces to allow server 58 to communicate over network 74 and with base station 62. For example, server 58 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments for server 58 is contemplated.

Intermediation server 58 maintains a copy of device identifier 134, and is configured to send messages that are addressed using device identifier 134, to device 54. Intermediation server 58 and device 54 are thus complementary to each other in that device identifier 134 is used by intermediation server 58 to send messages to device 54. While a BlackBerry™ computing environment is not required to implement the present teachings, where a BlackBerry™ computing environment is used to implement system 50, then intermediation server 58 can be implemented as a "Relay" server that is specific to a BlackBerry™ computing environment.

Server 82 can be based on the same or different computing environment as server 58. Sending server 82 is, in turn, configured to maintain a message 90 that can be marked for delivery to device 54 via message application 136 using unique identifier 134. Message 90 can be any of the types discussed above.

Figure 3:
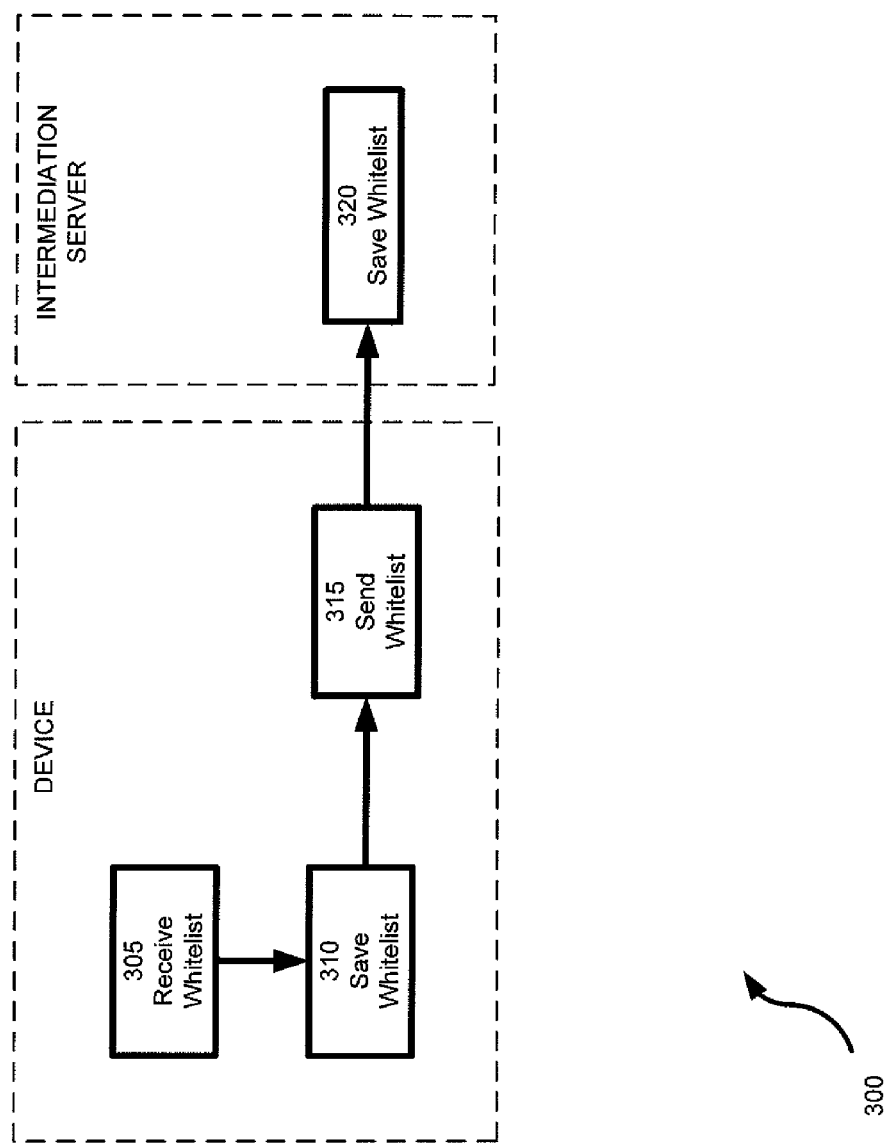
FIG. 3 shows a flow-chart depicting a method of updating a whitelist.

Referring now to FIG. 3, a flowchart depicting a method of updating a whitelist is indicated generally at 300. Method 300 can be implemented on system 50 or a suitable variation thereof. Method 300 can be performed once or several times, as needed, to provide an up-to-date whitelist.

Block 305 comprises receiving a whitelist identifier. Block 305 can be effected by receiving input using keyboard 100 and generating a graphical interface on display 124 that shows the received input. The graphical interface can be configured to also provide a menu of options so that the received whitelist identifier can be viewed, edited, saved or deleted. Such a whitelist identifier indicates any address on network 74 which is permitted to send messages to message application 136 using device identifier 134. The whitelist address itself can be in any format (e.g. internet protocol (IP) address, MAC address, email address), and need not be, though can be, of the same format as unique device identifier 134.

Various types of different graphical interfaces can be generated to effect block 305, including the entry via keyboard 100 of the whitelist identifier, or by selecting whitelist identifiers that are loaded onto device 54, such as through a contact manager application (not shown). Whitelist identifiers can also be received as being implicit during the provisioning of device 54; for example, assuming device 54 connects to server 82 as part of its provisioning, then server 82 can be automatically included to the whitelist received at block 305.

At block 310, the whitelist identifier received at block 305 is saved. In a present embodiment the whitelist identifier is stored within configuration file 138. At blocks 315 and 320, the whitelist is sent to and received by intermediation server 58, which saves a local copy of the whitelist. Again, in a present embodiment, blocks 315 and 320 are effected by sending configuration file 138 to intermediation server 58, which then saves a local copy of the whitelist.

Figure 4:
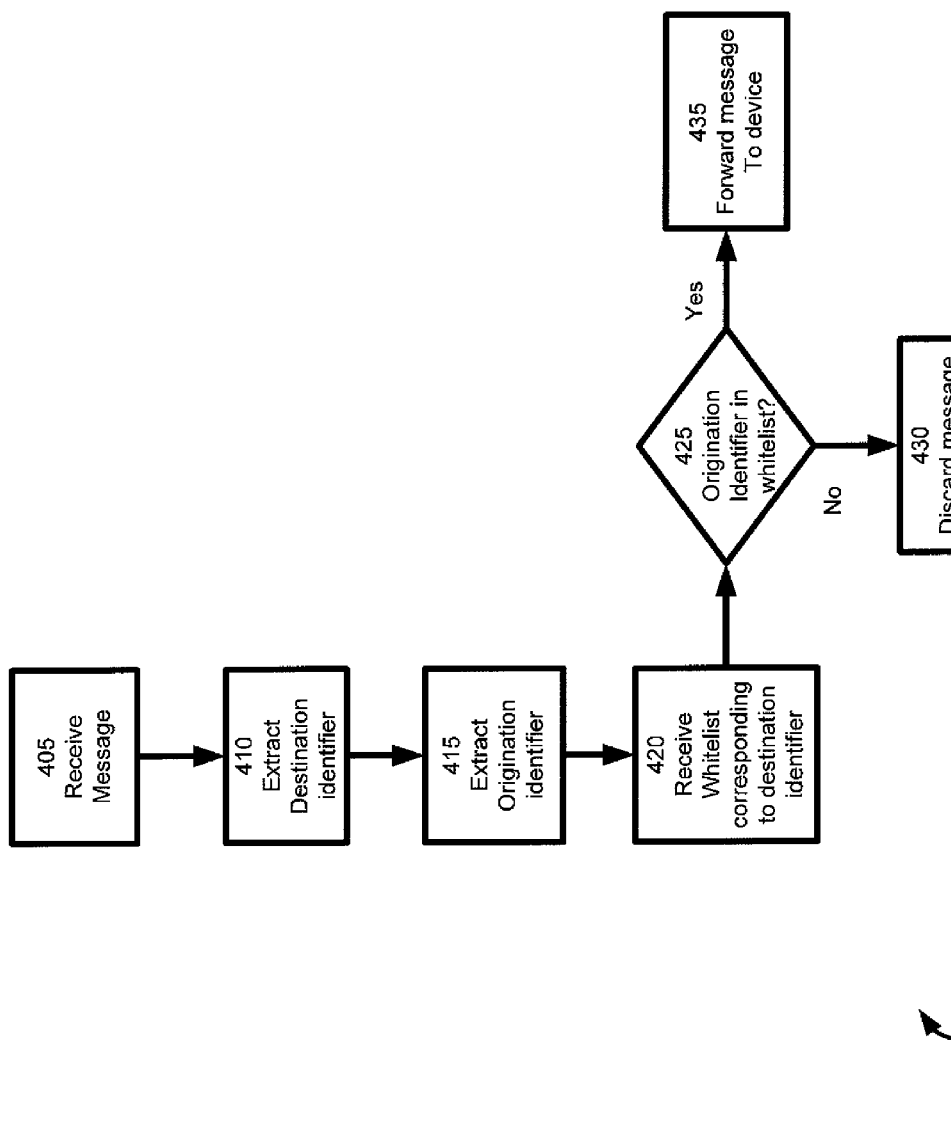
FIG. 4 shows a flow-chart depicting a method of managing packet delivery.

Referring now to FIG. 4, a flowchart depicting a method of managing packet delivery is indicated generally at 400. Method 400 can be implemented on system 50 or a suitable variation thereof. Method 400 assumes that a whitelist has been generated and saved on intermediation server 58, using method 300 or a suitable variation thereof. Method 400 can be performed by intermediation server 58.

Block 405 comprises receiving a message. The message is received at intermediation server 58. The message includes a destination identifier 134 that is extractable by intermediation server 58. The destination identifier 134 indicates the message is destined for device 54. The message also includes an origination address of server 82 that is extractable by intermediation server 58. The message also includes a payload. The payload can optionally be encrypted using an encryption mechanism that is unique to the electronic device and said originating server such that the intermediation server 58 cannot decrypt the payload.

Block 410 therefore comprises extracting destination identifier 134, and block 415 comprises extracting the origination identifier.

For purpose of explaining method 400, assume that the message received at block 405 is message 90, and that message 90 is sent from server 82 and bears the destination identifier 134 as the destination address, and is therefore destined for device 54.

At block 420, the whitelist respective to the destination identifier received at block 410 is received. Where method 300 was performed, the whitelist retrieved at block 420 corresponds to the whitelist that was saved at block 320 of method 300.

At block 425, a determination is made as to whether the origination identifier from block 415 is in the whitelist received at block 420. If "no", (in other words, delivery to device 54 is not permitted according to the whitelist) then at block 430 the message is discarded. If "yes" (in other words, delivery to device 54 is permitted according to the whitelist) then at block 435 the message is forwarded to device 54 over bearer path 70.

Figure 5:
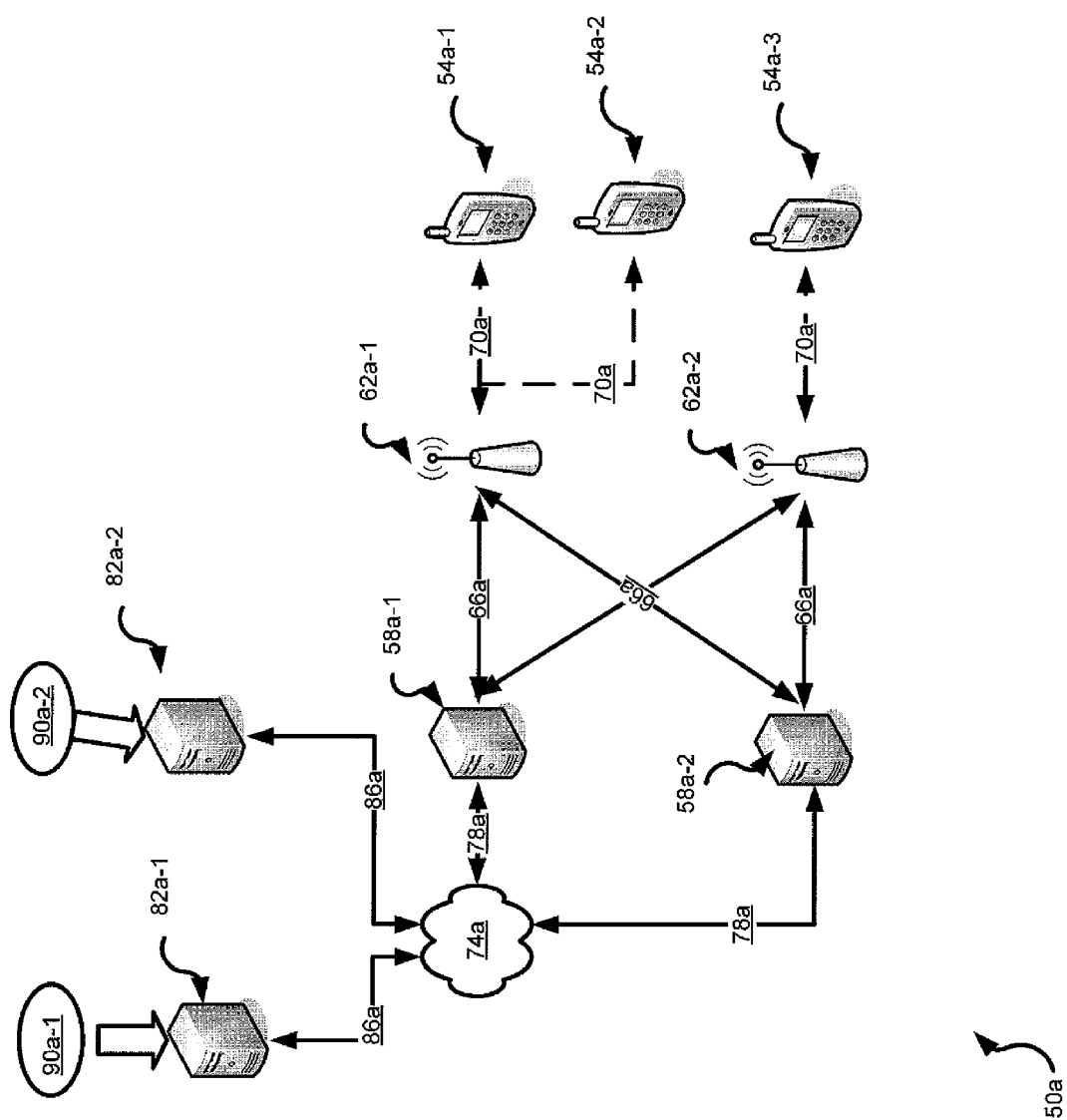
FIG. 5 shows a modified version of the system of FIG. 1.

Variations of the foregoing are contemplated. For example, FIG. 5 shows system 50a which is a variation on system 50 and like elements in system 50a include like references to their counterparts in system 50, except followed by the suffix "a". System 50a reflects a "scaled-up" version of system 50, and thus includes a plurality of devices 54a, a plurality of base stations 62a, a plurality of intermediation servers 58a, and a plurality of sending servers 82a. Upon further review of this specification, it will become apparent that system 50a can be "scaled-up" further to, for example, several thousand servers 58a, several thousand servers 82a and millions of devices 54a.

In FIG. 5, it can be noted that device 54a-1 and device 54a-2 are shown in communication with base station 62a-1, while device 54a-3 is shown in communication with base station 62a-2. This is merely an exemplary structure, and it should be understood that each device 54a can communicate with either base station 62a depending on their proximity to a given base station 62a.

Also of note, in system 50a servers 82a can be implemented, in a non-limiting example, as enterprise servers, such as BlackBerry™ Enterprise Servers that are hosted and maintained by an enterprise that is associated with each device 54a, and servers 58a can be implemented as relay servers such as Relay Servers that are hosted and maintained by a carrier, or a carrier partner such as Research In Motion Limited. However, the entity (or entities) that host(s) and maintain(s) each server 82a and each server 58a is not particularly limited and is discussed herein for an example of a potential real-world implementation. In terms of technical structure, servers 82a can also be referred to as content servers 82a, whereas servers 58a can be referred to as transport intermediation servers.

In a present embodiment, a message 90a can be sent from its corresponding server 82a to a device 54a uniquely associated with that particular server 82a. Such messages 90a, or at least their payloads, can be passed in encrypted form, if desired, by providing a key pair or other encrypting means at one server 82a and a corresponding device 54a, such that communications carried through server 58a are secure. Key pairing or other encryption means is one example of how a particular device 54a can be uniquely associated with a given server 82a. In practice, such a unique association can arise as a given enterprise acquires a server 82a and one or more devices 54a, and then distributes those acquired devices 54a to its employees, so that the employees can conduct the business of the enterprise using their device 54a. A technological association is made between such devices 54a and server 82a in the form a key pair or other encrypting means, such that the electronic communications conducted on the devices 54a are confidential from other parties that also connect to network 74a and may inadvertently or intentionally intercept such electronic communications.

Figure 6:
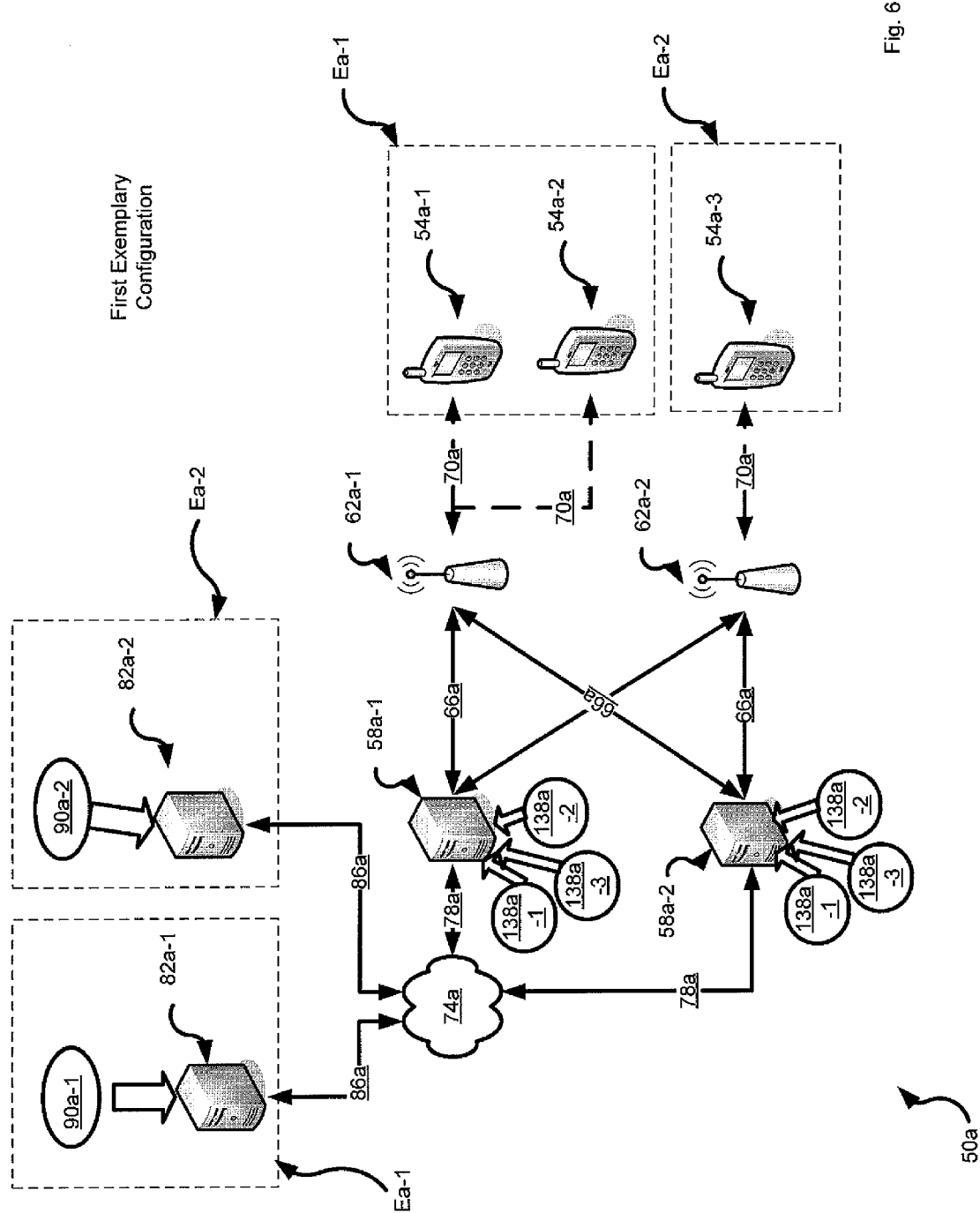
FIG. 6 shows the system of FIG. 5 according to a first configuration.

To explain the present embodiment further, assume that, in a first exemplary configuration of system 50a, device 54a-1 is associated with server 82a-1; device 54a-2 is associated with server 82a-1; and that device 54a-3 is associated with server 82a-2. FIG. 6 shows this exemplary first configuration, where a first enterprise Ea-1 is associated with server 82a-1, device 54a-1 and device 54a-2, and a second enterprise Ea-2 is associated with server 82a-2, and device 54a-3. Configuration files 138a for each device 54a are stored on each transport intermediation server 52a, as a result of, for example, a prior performance of method 300 in relation to each device 54a. (Note that in other embodiments, not shown, one transport intermediation servers 52a could be dedicated to only certain devices 54a). As part of multiple performances of method 300, the above-described associations are technologically configured into system 50a, such that server 82a-1 is on the whitelist for device 54a-1, and server 82a-1 on the whitelist for device 54a-2; and likewise server 82a-2 is on the whitelist for device 54a-3. Thus, during performances of method 400, if message 90a-1 was addressed to device 54a-3, then message 90a-1 would be dropped by servers 58a, but if message 90a-1 was addressed to device 54a-1 or device 54a-2, then message 90a would be delivered by servers 58a; likewise, if message 90a-2 was addressed to device 54a-3, then message 90a-2 would be delivered by servers 58a, but if message 90a-2 was addressed to device 54a-1 or device 54a-2, then message 90a-2 would be dropped by servers 58a.

Figure 7:
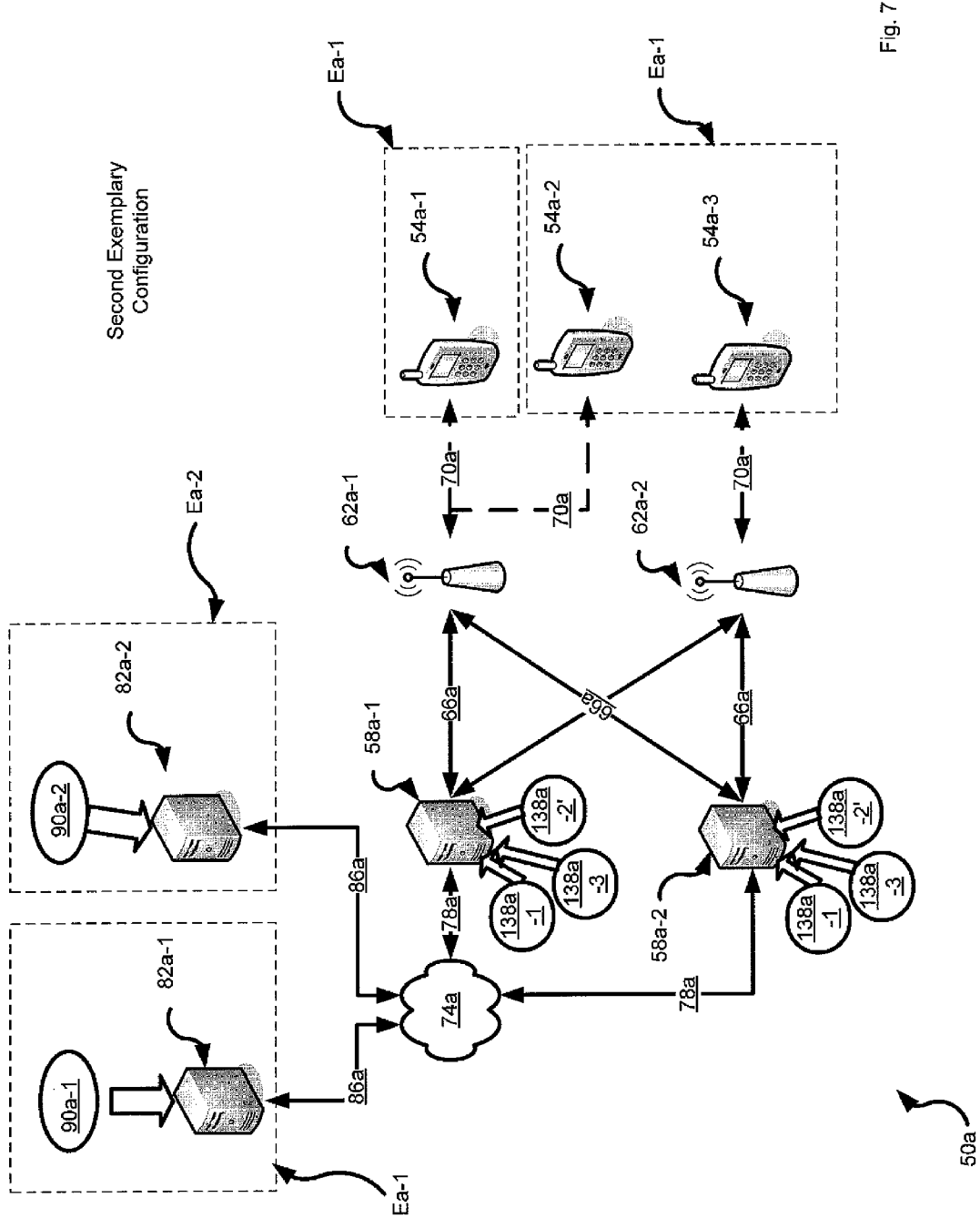
FIG. 7 shows the system of FIG. 5 according to a second configuration.

A feature of the present specification is the ability to change the association of one device 54a from an association with one server 82a to another server 82a, without exposing that device 54a to subsequent unwanted packet deliveries from the original server 82a. For example, assume that device 54a-2 is currently associated with server 58a-1 according to the first configuration in FIG. 5, but that device 54a-2 needs to be reconfigured to drop the association with server 82a-1 and establish a new association with server 82a-2. The desired result of such reconfiguration is shown in FIG. 7, as a second exemplary configuration. In FIG. 7, configuration file 138a-1 and configuration file 138a-3 as they are stored on servers 82a are unchanged, but a new configuration file 138a-2' is stored on servers 58a, such that method 400a would deliver message 90a-2 if message 90a-2 was addressed device 54a-2, but method 400 would drop message 90a-1 if message 90a-1 was addressed to device 54a-2.

Figure 8:
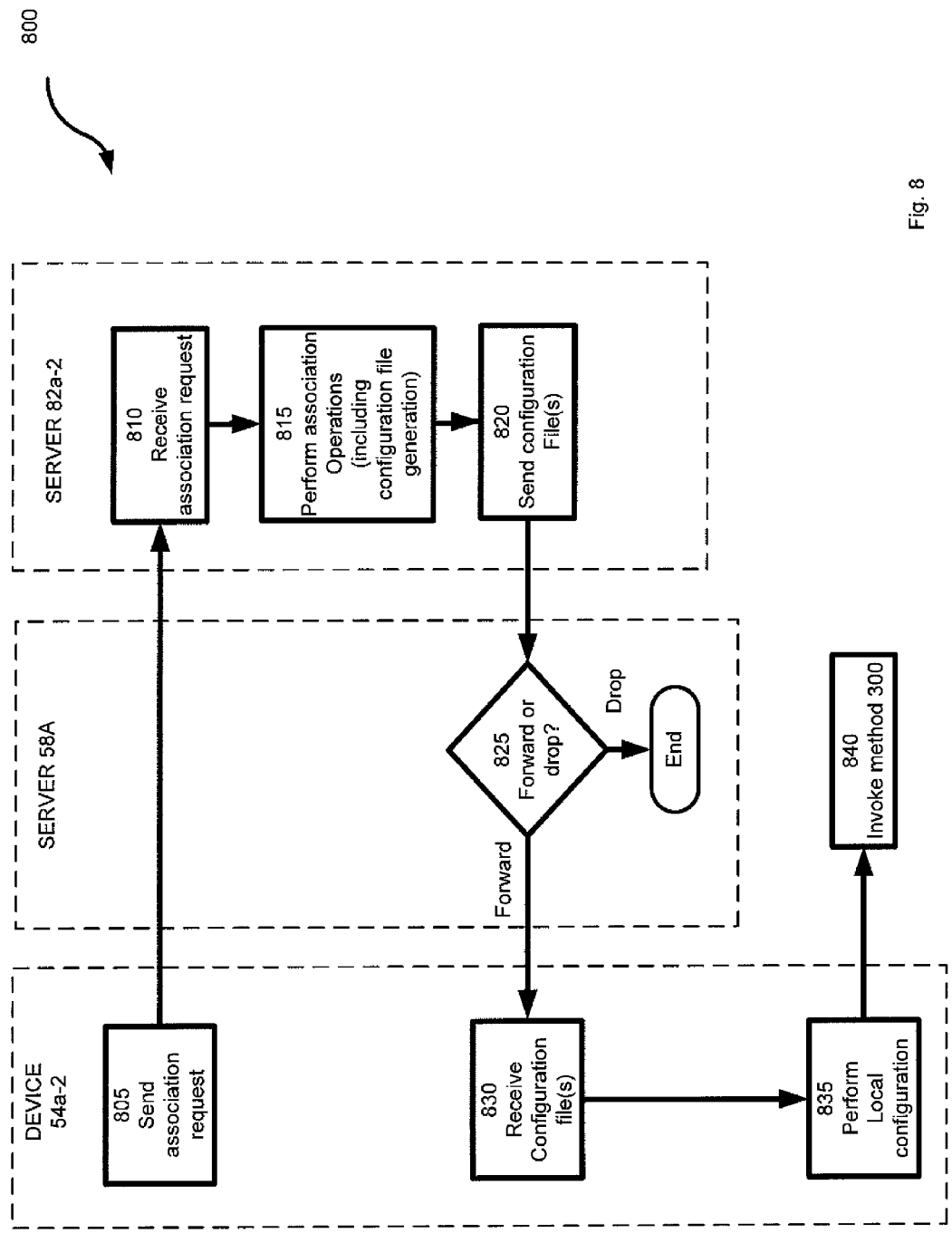
FIG. 8 shows a flow-chart depicting a method of associating an electronic device with a content server.

Various methods are contemplated of performing the transition from the configuration in FIG. 6 to the configuration in FIG. 7. Method 800 in FIG. 8 shows an example of one such method for performing the transition. At block 805, it is assumed that system 50a is configured according to FIG. 6, but by block 840, system 50a is configured according to FIG. 7. (While FIG. 8 makes specific reference to device 54a-2 and server 82a-2, it is to be understood that method 800 can be employed in relation to any one of devices 54a establishing association with any one of servers 82a). At block 805, device 54a-2 sends an association request. The association request at device 54a-2 can be formed using an email address or other unique identifier of server 82a-2, and, if desired, a password that is known to server 82a-2. For added security, if desired, the association request can be encrypted using a public encryption key paired with a private encryption key that is local to server 82a-2, where the public encryption key can be fetched from a public encryption key repository that is accessible to device 54a-2.

The association request is sent through one of the servers 58a to server 82a-2, where it is received thereby at block 810. At block 815, server 82a performs a series of association operations in order to locally associate device 54a-2 with server 82a-2, including the generation of one or more configuration files that will be sent to and used by device 54a-2 to locally associate device 54a-2 with server 82a-2. The association operations at block 815 are not particularly limited. In general where device 54a-2, server 58a, and server 82a-2 are based on a BlackBerry™ infrastructure, then blocks 805 through block 815 can include substantially the same steps that are involved with a current activation technique of a BlackBerry™ device (which is one non-limiting example of a way to implement of device 54a-2) on a particular BlackBerry™ Enterprise Server (which is one non-limiting example of a way to implement of server 82a-2). In this specific implementation, the configuration files can be implemented as a Service Book within the BlackBerry™ infrastructure.

At block 820, the configuration files generated at block 815 are sent back over network 74a and addressed device 54a-2 via server 58a. Again, such files are typically sent back in encrypted format—and indeed such files typically include the new encryption keys that reflect a unique pairing between device 54a-2 and server 82a. However, once those configuration files reach server 58a, at block 825, server 58a makes a determination as to whether to forward or drop the configuration files. Block 825 is performed for substantially the same reason as method 400. Typically, due to the fact that the configuration files that are sent at block 820 are encrypted, then block 825 is performed as an extension to method 400, since server 58a cannot examine the payload itself and is only aware that certain encrypted data is being addressed for delivery to device 54a-2.

If a "drop" determination is made at block 825, then method 800 ends. If a "forward" determination is made at block 825 then the configuration files are actually sent to device 54a-2, and at block 830 the configuration files are received by device 54a-2.

At block 835, device 54a-2 performs local configurations to complete the association of device 54a-2 with server 82a-2. Again, to provide a non-limiting specific exemplary implementation of block 835, if device 54a-2, server 58a, and server 82a-2 are based on a BlackBerry™ infrastructure, then blocks 835 can include substantially the same completion steps that are involved with a current activation technique of a BlackBerry™ device. In such BlackBerry™ environment, block 835 can include the storing and local processing of the configuration files (i.e. Service Books).

At block 840, method 300 is invoked so that servers 58a are informed of the new association between device 54a-2 and server 82a-2. At this point, the transition to the configuration is FIG. 6 is complete.

Figure 9:
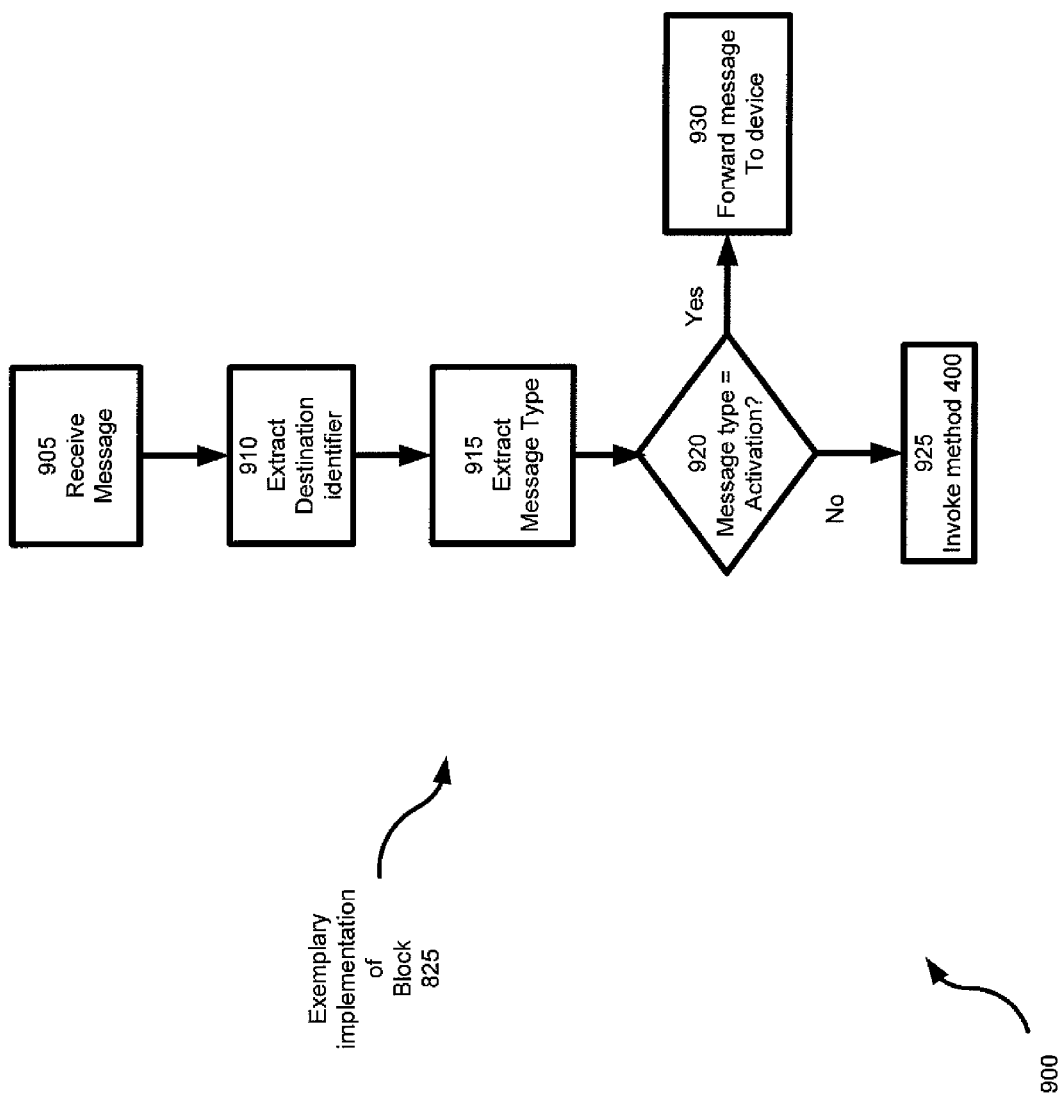
FIG. 9 shows flow-chart depicting a method of one exemplary way of performing block 825 of the method of FIG. 8.

As discussed above, block 825 can be effected in a variety of ways. Method 900 in FIG. 9 shows one possible way of implementing block 825. Method 900 is performed by server 58a. At block 905 a message is received. The type of message received at block 905 can either be a configuration file of the type sent according to block 820, or a payload message of the type received at block 405. In this manner method 900 serves to augment method 400. At block 910 the destination identifier is extracted—substantially in the same manner that block 410 is implemented. At block 915 a message type is extracted. Method 900 thus assumes that a flag or other type of identifier is generated as part of block 820 which indicates that configuration files are being sent—and that such a flag can only be used by server 82a for configuration files. At block 920 a determination is made as to whether the message type indicates that an activation is occurring. An activation will be deemed to be occurring at block 920 if the message type at block 915 indicates has a flag indicating configuration files. A "yes" determination will lead to the configuration files being forwarded to the destination device 54a at block 930, at which point method 800 can continue from block 830. A "no" determination will lead to the invocation of method 400 at block 925. To further augment security, block 915 can be effected by using a predefined set of encryption keys between servers 58a and each server 82a whereby the message type is encrypted by server 82a, but so that server 58a can still ascertain the message type.

Figure 10:
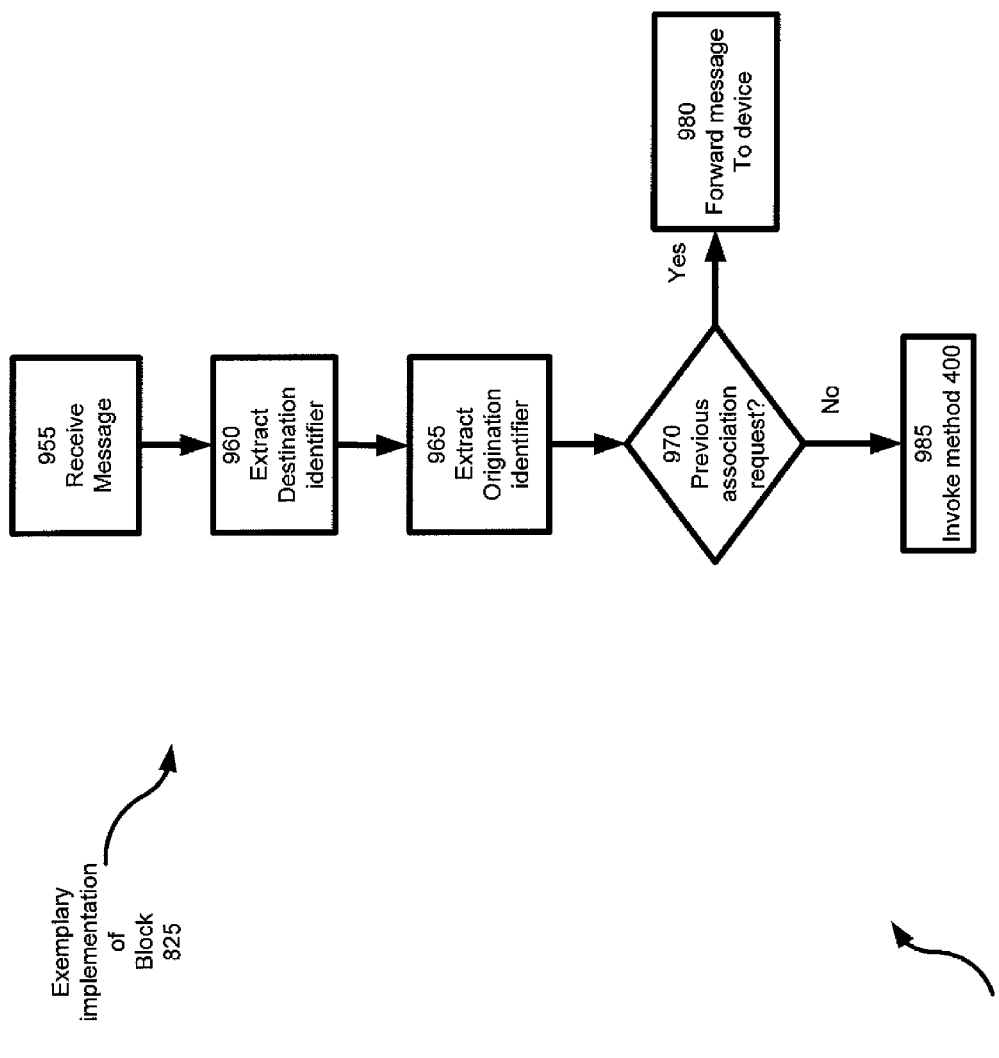
FIG. 10 shows flow-chart depicting a method of another exemplary way of performing block 825 of the method of FIG. 8.

Method 950 in FIG. 10 shows another possible way of implementing block 825. Method 950 is performed by server 58a. At block 955 a message is received. The type of message received at block 955 can either be a configuration file of the type sent according to block 820, or a payload message of the type received at block 405. In this manner method 950 serves to augment method 400. At block 960 the destination identifier is extracted—substantially in the same manner that block 410 is implemented. At block 965 the origination identifier is extracted—substantially in the same manner that block 415 is implemented. At block 970 a determination is made as to whether a previous association request had been made from the destination identifier device to origination identifier device. Performance of block 970 can be based on, for example, server 58a making a record of the forwarding of the association request that was carried by server 58a between block 805 and block 810 of method 800. A "yes" determination will lead to the configuration files being forwarded to the destination device 54a at block 980, at which point method 800 can continue from block 830. A "no" determination will lead to the invocation of method 400 at block 985.

Figure 11:
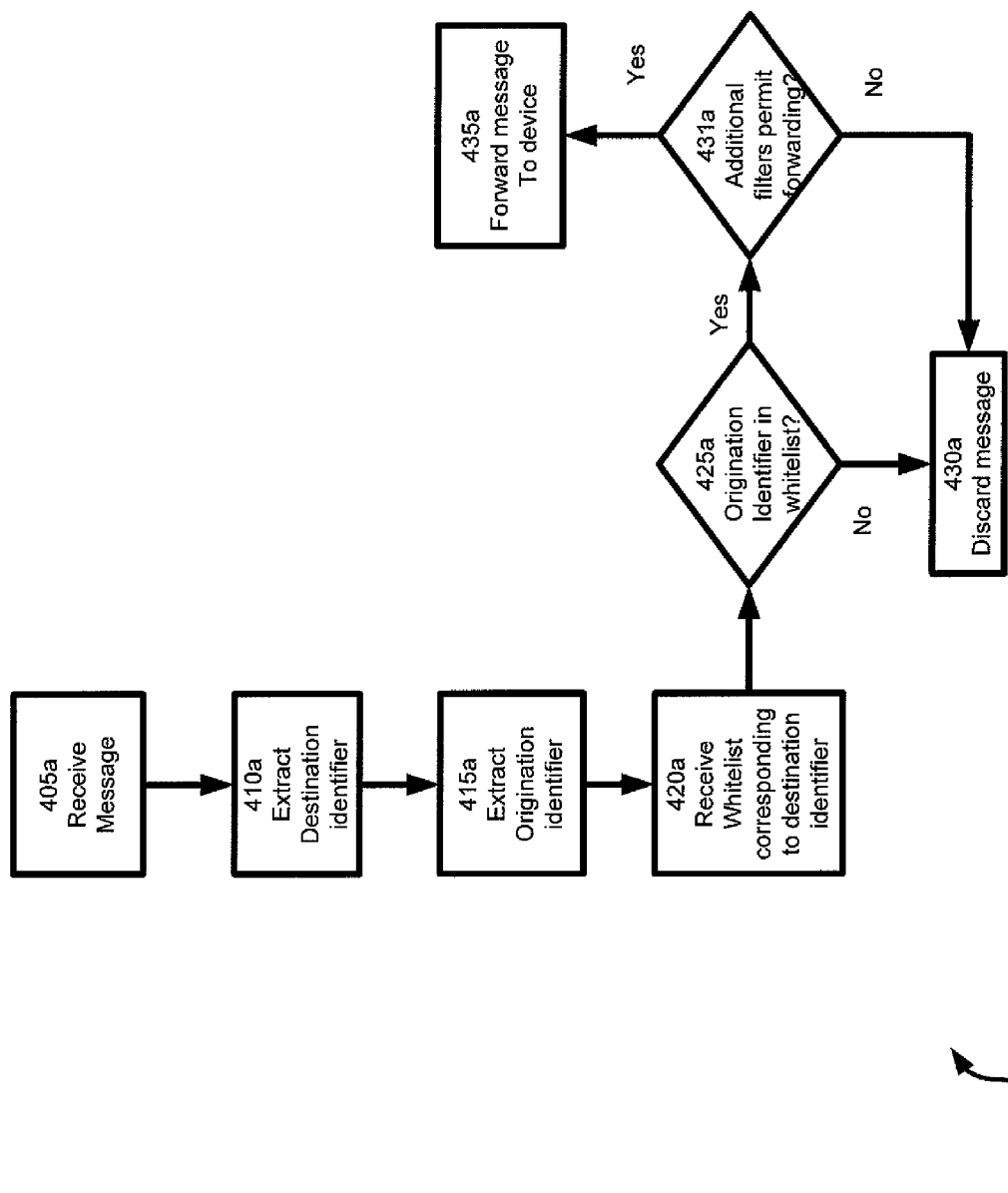
FIG. 11 shows a flow-chart depicting a modified version of the method of FIG. 4.

As a still further variation, method 400a is shown in FIG. 11. Method 400a is substantially the same as method 400, except like blocks bear like references except followed by the suffix "a". Of note is that method 400a includes a further block in the form of block 431a. Block 431a contemplates that additional filtering can be performed, beyond that performed in block 425a. The filtering can be based on other characteristics of the message including, for example, packet type, IP ports, or a combination of thereof. For example, messages involving transport control protocol (TCP) packets from a given server 82 can be flagged as not being permitted, whereas messages with CMIME, ITADMIN, IPPP, and CICAL packets from that same server 82 can be flagged as being permitted. Thus the filtering in method 400a is generally more powerful than the filter in method 400. However, method 400 can be faster since it omits block 431a. To achieve a compromise, a combination of method 400 and method 400a can be employed, whereby certain origination identifiers are purely whitelisted, whereas other origination identifiers require further filtering. Those origination identifiers that are purely whitelisted can send messages that bypass block 431a altogether, but those origination identifiers that require further filtering can be forwarded onto block 431a. It will now occur to those skilled in the art that block 431a would involve creation of a whitelist (which can also be more generally referred to as a filtering policy) that provides criteria usable at block 430a and 431a. Note that the amount of filtering that can be performed at block 431a can be reduced depending on the level of encryption of the payload messages being carried. Where messages are not encrypted, then more filtering options are available at block 431a, but where message payload is fully encrypted such that it cannot be examined by server 58, then the possible types of filtering at block 431a can be limited.

It will now be apparent that method 400, (and method 400a) and block 825) have the benefit stopping delivery of unwanted packets to device 54a and thereby reduce wasted bandwidth over link 70a and reduce wastage of limited processing and memory resources on device 54a. The teachings herein permit servers 58a to perform the function of stopping delivery of unwanted packets (or messages), while at the same time permitting servers 58a to preserve the encryption of those packets (or messages). In the specific example given above, it can be possible that server 82a-1 never disassociates itself from device 58a-2 and may continue, erroneously, to try and send message 90a-1 to device 54a-2. In this scenario, message 90a-1 will be dropped by servers 58a as part of performance of method 400. One can note that without the teachings herein, where encryption used as part of the association between servers 82a and devices 54a are employed, message 90a-1 could not be opened by device 54a-2 even if message 90a-1 was actually delivered to device 54a-2, due to the fact that message 90a-1 would be encrypted with an encryption key that is not stored on device 54a-2. However, bandwidth of link 70a and processing resources of device 54a-2 are still consumed simply having to receive the message 90a-1 and trying to decrypt it. Further, an operator of server 82a-1 erroneously continually retries to send message 90a-1 (or different messages) to device 54a-2, the constant receipt of messages 90a-1 could slow down the operation of device 54a-2 until server 82a-1 stops sending the message 90a-1. The teachings herein thereby mitigate this problem and thereby provide a further benefit.

Variations of the foregoing are contemplated. For example, block 815 of method 800 can be performed so that the configuration file generated at block 815 can include establishment of a configuration file that includes a whitelist, which automatically includes server 82a-2. This whitelist can be suitable for use as part of method 300, but obviating the need for blocks 305 and 310 in method 300 as server 82a-2 will already be include in that whitelist. In this manner other identifiers can also be automatically added into the whitelist by server 82a-2.

It should be noted that separate configuration files 138, or records within one configuration file 138, can be maintained for different message types, including emails (e.g. Multipurpose Internet Mail Extensions (MIME)), instant messages (IM), calendar appointments (e.g. vCal, iCal), contact information (e.g. vCard), video files, or audio files or other types of messages as well, such that different message types have different whitelists associated with the same or different content servers.

It should be noted that the whitelists can also include originating devices other than content servers. More generically, a whitelist can be considered a delivery policy, which can include whitelisted addresses or blacklisted addresses or both.

Combinations, variations and subsets of the foregoing are contemplated.

The claims attached hereto define the scope of the monopoly sought.

The invention claimed is:

1. A method of managing packet delivery comprising:
receiving, at a transport intermediation server, a plurality of association requests from a plurality of electronic devices, respective ones of the association requests being received from respective ones of the plurality of electronic devices to associate respective ones of the plurality of electronic devices with respective ones of a plurality of origination content computers;

recording, at said transport intermediation server, for each respective one of the association requests, an association between a unique absolute destination identifier associated with the respective electronic device and a unique origination identifier associated with the respective origination content computer;

receiving a message at said transport intermediation server from an origination content computer of the plurality of origination content computers;

said message including said origination identifier associated with said origination content computer;

said message including said absolute destination identifier uniquely associated with an electronic device of said plurality of electronic devices to which said message is addressed;

said message including a payload encrypted by said content computer such that only said electronic device can decrypt said payload;

said message including a message type indicator, wherein said message type indicator indicates whether said message is configuration file;

extracting, from said message, at said transport intermediation server, said unique absolute destination identifier, and said message type indicator;

in response to determining, at said transport intermediation server, that said message type indicator indicates that said message is a configuration file:
  forwarding said configuration file from said transport intermediation server to said electronic device uniquely associated with said unique absolute destination identifier, said configuration file including a new encryption key for establishing a unique encrypted connection between said electronic device and said origination content computer;

in response to determining, at said transport intermediation server, that said message type indicator indicates that said message is not a configuration file:
  extracting from said message, at said transport intermediation server, said origination identifier;
  retrieving, from a memory at said transport intermediation server, a delivery policy received from said electronic device and containing one or more identifiers of permitted senders of messages addressed to said unique absolute destination identifier;
  determining, at said transportation intermediation server, whether said origination identifier matches one of said permitted sender identifiers;
  determining whether forwarding of said message is permitted based on an internet protocol (IP) port number of said message;
    forwarding said message from said transport intermediation server to said electronic device based on said unique absolute destination identifier when said origination identifier matches one of said permitted sender identifiers and forwarding of said message is permitted; and
  absent determining, at said transportation intermediation server, that said origination identifier matches one of said permitted sender identifiers and forwarding of said message is permitted, dropping said message at said transport intermediation server.

2. The method according to claim 1 wherein said origination content computer is a content server.

3. The method according to claim 2, further comprising:
  wherein the configuration file includes said delivery policy wherein said delivery policy deems said origination identifier to be a permitted sender based on said recorded association request.

4. The method according to claim 1 wherein said unique absolute destination identifier uniquely associated with said electronic device comprises one of a media access control (MAC) identifier, an International Mobile Equipment Identity (IMEI) identifier, or a BlackBerry™PIN.

5. The method according to claim 1 wherein said message has a format according to one of the following: a Multipurpose Internet Mail Extension (MIME) format email, an instant message (IM), a calendar appointment, a contact information record, a video file, or an audio file.

6. The method according to claim 5 wherein said delivery policy is unique to said format.

7. The method according to claim 5 wherein a separate delivery policy is maintained according to each said format, and wherein said message further comprises a message format indication; and said method further comprises:
  extracting, from said message, said method format indication;
  selecting an appropriate said delivery policy based on said method format indication.

8. A transport intermediation server comprising:
  a network interface configured to:
    receive a plurality of association requests from a plurality of electronic devices, respective ones of the association requests being received from respective ones of the plurality of electronic devices to associate respective ones of the electronic devices with respective ones of a plurality of origination content computers; and,
    receive a message from an origination content computer of the plurality of origination content computers via a network;
  said message including said origination identifier associated with said origination content computer;
  said message including said absolute destination identifier uniquely associated with an electronic device of the plurality of electronic devices to which said message is addressed;
  said message including a payload encrypted by said content computer such that only said electronic device can decrypt said payload;
  said message including a indicates configuration file;
  a central processing unit configured to:
    record, for each respective one of the association requests, an association between a unique absolute destination identifier associated with the respective electronic device and a unique origination identifier of the respective origination content computer;
    extract, from said message, said unique absolute destination identifier and said message type indicator;
    in response to determining that said message type indicator indicates that said message is a configuration file:
      forward said configuration file, via said network interface, to said electronic device uniquely associated with said unique absolute destination identifier, the configuration file including a new encryption key for establishing a unique encrypted connection between said electronic device and said origination content computer;
    in response determining that said message type indicator indicates that said message is not a configuration file:
      extract from said message said origination identifier;

retrieve, from a memory, a delivery policy received from said electronic device and containing one or more identifiers of permitted senders of messages addressed to said unique absolute destination identifier;

determine whether said origination identifier matches one of said permitted sender identifiers, determine whether forwarding of said message is permitted based on an internet protocol (IP) port number of said message;

forward, via said network interface, said message to said electronic device uniquely associated with said unique absolute destination identifier when said origination identifier matches one of said permitted sender identifiers and-forwarding of said message is permitted;

absent determining that said origination identifier matches one of said permitted sender identifiers and forwarding of said message is permitted, drop said message.

9. The server according to claim 8 wherein said origination content computer is a content server.

10. The server according to claim 9 wherein said configuration file includes said delivery policy, said delivery policy deeming said origination identifier to be a permitted sender based on said recorded association request.

11. The server according to claim 8 wherein said unique absolute destination identifier uniquely associated with said electronic device comprises one of a media access control (MAC) identifier, an International Mobile Equipment Identity (IMEI) identifier, or a BlackBerry™ PIN.

12. The server according to claim 8 wherein said message has a format according to one of the following: a Multipurpose Internet Mail Extension (MIME) format email, an instant message (IM), a calendar appointment, a contact information record, a video file, or an audio file.

13. The server according to claim 12 wherein said delivery policy is unique to said format.

14. The server according to claim 12 wherein a separate delivery policy is maintained according to each said format, and wherein said message further comprises a message format indication; said central processing unit is further configured to:

extract, from said message, said method format indication;

select an appropriate said delivery policy based on said method format indication.

15. A non-transitory computer-readable medium storing a plurality of programming instructions; said programming instructions executable by a transport intermediation server; said programming instructions configured to render said transport intermediation server operable to perform a method of managing packet delivery comprising:

receiving, at a transport intermediation server, a plurality of association requests from a plurality of electronic devices, respective ones of the association requests being received from respective ones of the plurality of electronic devices to associate respective ones of the plurality of electronic devices with respective ones of a plurality of origination content computers;

recording, at said transport intermediation server, for each respective one of the association requests, an association between a unique absolute destination identifier associated with the respective electronic device and a unique origination identifier of the respective origination content computer;

receiving a message at said transport intermediation server from an origination content computer of the plurality of origination content computers; said message including said origination identifier uniquely associated with said origination content computer; said message including said absolute destination identifier uniquely associated with an electronic device of said plurality of electronic devices to which said message is addressed; said message including a payload encrypted by said content computer such that only said electronic device can decrypt said payload; said message including a message type indicator, wherein the message type indicator indicates whether said message is configuration file;

extracting, at said transport intermediation server, said unique absolute destination identifier and a message type indicator;

in response to determining, at said transport intermediation server, that said message type indicator indicates that said message is a configuration file:

forwarding said configuration file from said transport intermediation server to said electronic device uniquely associated with said unique absolute destination identifier, the configuration file including a new encryption key for establishing a unique encrypted connection between said electronic device and said content computer;

in response to determining, at said transport intermediation server, that said message type indicator indicates that said message is not a configuration file:

extracting from said message said origination identifier;

retrieving, from a memory at said transport intermediation server, a delivery policy received from said electronic device and containing one or more identifiers of permitted senders of messages addressed to said unique absolute destination identifier;

determining whether said origination identifier matches one of said permitted sender identifiers;

determining whether forwarding of said message is permitted based on an internet protocol (IP) port number of said message;

forwarding said message from said transport intermediation server to said electronic device based on said unique absolute destination identifier when said origination identifier matches one of said permitted sender identifiers and forwarding of said message is permitted; and absent determining that said origination identifier matches one of said permitted sender identifiers and that forwarding of said message is permitted, dropping said message at said transport intermediation server.

16. The method according to claim 15, further comprising, in response to determining, at said transport intermediation server, that said message type indicator indicates that said message is not a configuration filed prior to forwarding, at said transport intermediation server, said message to said electronic device, filtering the message to determine whether forwarding is permitted.

17. The non-transitory computer-readable medium according to claim 15, wherein said origination content computer is a content server.

18. The non-transitory computer-readable medium according to claim 17, wherein said configuration file includes said delivery policy, said delivery policy deeming said origination identifier to be a permitted sender based on said recorded association request.

19. The non-transitory computer-readable medium according to claim 18, wherein said delivery policy is unique to said format.

20. The non-transitory computer-readable medium according to claim 18, wherein a separate delivery policy is maintained according to each said format, and wherein said message further comprises a message format indication; and said method further comprises:
   extracting, from said message, said method format indication;
   selecting an appropriate said delivery policy based on said method format indication.

21. The non-transitory computer-readable medium according to claim 15, wherein said unique absolute destination identifier uniquely associated with said electronic device comprises one of a media access control (MAC) identifier, an International Mobile Equipment Identity (IMEI) identifier, or a BlackBerry™PIN.

22. The non-transitory computer-readable medium according to claim 15, wherein said message has a format according to one of the following: a Multipurpose Internet Mail Extension (MIME) format email, an instant message (IM), a calendar appointment, a contact information record, a video file, or an audio file.

* * * * *